United States Patent Office 2,929,716
Patented Mar. 22, 1960

2,929,716

INSTANT COFFEE

William E. Barch and Ismar M. Reich, Stamford, Conn., assignors to Standard Brands Incorporated, New York, N.Y., a corporation of Delaware No Drawing. Application February 25, 1957
Serial No. 641,877

15 Claims. (Cl. 99—71)

This invention relates to a solid water-soluble coffee extract known as "instant coffee" and the preparation of the same.

Instant coffees manufactured by modern spray drying processes give a product consisting of small hollow spheres, the walls of which are pebbled with tiny solidified bubbles. Instant coffee in this form is ideal from the standpoint of rapid solution rate, low bulk density and ease of manufacture. It tends to give, however, a more or less persistent surface foam when dissolved in water which detracts from the appearance of what would otherwise be a clear cup of coffee. The foam appears to originate in the solidified spheres or bubbles of the dry product because rupturing them, as by grinding before dissolving, eliminates formation of a persistent foam. The solidified bubbles apparently act as templates for their liquid replicas. Instant coffees manufactured by other methods may also tend to produce a persistant foam when dissolved in water.

We have found that such foam formation can be greatly reduced or avoided by incorporating small amounts of the higher fatty acids or their edible salts or both in instant coffee.

Both green coffee and roasted coffee contain oil. The oil extracted from green coffee contains naturally about 3% free fatty acids, which increases to 4-5% in oil from roasted coffee, due to hydrolytic cleavage during roasting. The amount of fatty acids finding their way into instant coffee during manufacture is very small because of low solubility of the fatty acids in water and the fact that the amount of extraction water is purposely kept as low as feasible.

In accordance with the invention a small amount of the fatty acid or fatty acid salt or both is incorporated in instant coffee sufficient to prevent formation of a persistent foam or to promptly break the foam formed when the coffee is dissolved in water. Any edible fatty acid, saturated or unsaturated, having twelve or more carbon atoms and preferably from 12 to 20 carbon atoms, may be used, for example, lauric, oleic, linoleic, linolenic, palmitic, myristic, stearic and arachidic. Also the edible salts of these fatty acids may be used including particularly the salts of the alkali metals, the alkaline earth metals, magnesium, ammonium and organic bases.

Very small amounts of the fatty acid or fatty acid salt are sufficient to reduce foaming substantially. As little as 1 part per 20,000 parts of solid coffee extract or even less will give good results. Larger amounts may be advisable in some cases for optimum effect. Generally speaking, amounts greater than 1 part in 500 will not give further improvement and therefore would not be advisable for reasons of economy.

The fatty acids and fatty acid salts derived from coffee fat are preferred. Those derived from other fats are as effective, but their use is attendant with certain disadvantages. When purified they tend to come out of solution and form a surface scum in the cup of instant coffee brew. The higher the degree of purification, the greater is this tendency. Less pure technical grade acids always carry a hint in their odor and flavor of their fat source which is very undesirable considering the sensitivity of coffee flavor and aroma to foreign or off notes. The mixtures of coffee fatty acids, on the other hand, not only does not contribute to cup surface scum formation, but has odors and flavors compatible with, and not detrimental to, the coffee brew. An additional and important advantage in their use is the presence of natural coffee flavor stabilizers in the impurities which retard flavor deterioration in the instant coffee for long periods in storage.

The coffee oil used as a starting material in the preparation of the fatty acids and their salts may be derived from green coffee, roasted coffee, spent coffee grounds or coffee chaff in any desired manner as by pressing or extraction with an organic solvent. To obtain the fatty acids, the coffee oil is saponified with caustic soda or other alkali and the resulting soaps are hydrolized with an acid. The crude fatty acids thus obtained are washed with water and may be used without refining.

The effectiveness of the fatty acids and their salts in reducing cup foam, and therefore the amount required, depends in good part on the method of distribution on the instant coffee. The most convenient method of application is simple addition to the aqueous coffee extract before spray drying. By this method only part of the added material is at the surface of the dry instant coffee particle in the location where it is needed for rapid foam break on first water contact. The minimum amount required by this method of application is about 1 part in 5,000 for optimum effect. Because of the low water solubility and minute amount of material added, it is advisable to emulsify the material to be added with a small portion of hot coffee extract, for instance, in a Waring Blendor, before addition to the main extract body. Blending the emulsion into the main body may be by simple stirring into the extract or by means of a proportioning pump as the extract is entering the nozzle in the spray dryer.

With dry application to the instant coffee all of the fatty acid or fatty acid salt is at the particle surface where its action in breaking foam is most quickly exercised. The minimum quantity required for optimum effect is about 1 part in 20,000. Without some dilution, even distribution of such a small quantity over the entire bulk of the instant coffee is a practical impossibility. A solvent can be used as a diluent and the solution sprayed on the coffee but this is attended with difficulties in the later removal of the solvent. A more satisfactory diluent is instant coffee itself. One to five percent of the instant coffee to be treated is ground with the fatty acid or fatty acid salt to a fine powder. The fine powder is distributed over the surface of the relatively larger particles of the main bulk of instant coffee, for instance, by rolling in a drum. It can also be proportioned as a powder into the spray dryer or into the line leaving it. The calcium salts are particularly amenable to this method of application because of the fineness with which they can be powdered.

The invention is illustrated by the following examples which are not intended to limit the scope of the invention in any way.

EXAMPLE 1.—EXTRACTION OF COFFEE OIL FROM SPENT COFFEE GROUNDS

Dry spent coffee grounds contain approximately 20 to 25% oil. The grounds may be extracted wet or after drying, depending on the solvent system employed.

Dried spent coffee grounds are charged to a closed extraction vessel. Sufficient solvent, methylene chloride, for example, is added to cover the grounds. Miscella is withdrawn from the bottom of the vessel and distilled. The distilled solvent is returned to the top of the vessel. Fatty materials extracted from the grounds remain in the still where they are recovered. For example, about 200 pounds of dry coffee grounds were charged together with 550 pounds of methylene chloride. After circulating the solvent to the still and the distilled solvent back to the extractor at a rate of about 5 pounds per minute for 9 hours, about 40 pounds of oil was recovered from the still. Water and steam were admitted to the extraction vessel and the residual solvent was recovered.

EXAMPLE 2.—COFFEE OIL FROM COFFEE CHAFF

The chaff collected from coffee roasters contains less coffee oil (approximately 7–8%) than dry spent grounds. It has the advantage, however, that when water immiscible solvents are used, no drying is required before oil extraction. Other advantages are inherent. The derived fatty acids contain congeners which are more highly odoriferous and aromatic and have a greater coffee flavor stabilizing action than those in the fatty acids from spent grounds. The stabilizing substance acts not only to retard rancidity of the fatty acids but toward extended preservation of the fresh aroma and flavor of the instant coffee itself.

The chaff is placed in a closed extraction vessel. A solvent, methylene chloride, for example, is added to cover the chaff. The solvent is drained and distilled to separate the extracted fat from the solvent. The distilled solvent is returned to the chaff bed and this contacting procedure is repeated three more times. Then steam and hot water are added to the bed of chaff to strip off the solvent. The solvent and water vapors are condensed and the solvent phase decanted and saved for the next batch. The fat remaining in the still after the four contacts is the raw material for the production of coffee fatty acids. Using 250 pounds of chaff, about 3,000 pounds of methylene chloride is required to cover the chaff bed. About 1,750 pounds of miscella is drained in each contact. About 20 pounds of fatty material is extracted from 250 pounds of chaff.

EXAMPLE 3.—PREPARATION OF COFFEE FATTY ACIDS

One hundred parts of fatty material extracted from any coffee source, for instance, spent coffee grounds, coffee chaff, green coffee or roasted coffee, are mixed with 50 parts of cold water. Twenty-five parts of caustic potash are added. The mixture is heated to boiling and held for 15 minutes. Fourteen hundred parts of hot water are added in portions over a period of a half hour.

Then 80 parts of 30% sulfuric acid are added, and the mixture is simmered for ½ hour. The material is cooled whereupon a cake or coffee fatty acids is formed on the surface of the liquid. The fatty acids are washed with water to remove the excess sulfuric acid after which they are ready for use. They may be dried if desired. The fatty acids may be converted into edible salts by roasting with neutralizing compounds, for example sodium carbonate.

EXAMPLE 4.—APPLICATION OF FATTY ACIDS AND THEIR SALTS TO DRY INSTANT COFFEE

To treat 100 parts of dry instant coffee, five parts of the coffee were mixed with a quantity of the fatty acid or fatty acid salt in a hand mortar and the mixture was ground to a fine powder (about 200 mesh). The compounds and the quantity used are indicated in the table below. This powder was placed together with the remaining 95 parts of the dry coffee in a drum in which it was tumbled for approximately ten minutes.

A teaspoonful (2.25 grams) of the treated coffee was placed in a cup, 150 cc. of boiling water was added, the mixture was stirred with a spoon and then the foam formation and subsidence was observed. A foam which consists of many fine bubbles appearing on the surface of the brewed instant coffee, which persists longer than a minute or two, and does not break upon simple stirring, is regarded as being objectionable.

The effectiveness of the anti-foam is best evaluated by simple cupping in this manner. However, a numerical value for comparison purposes can be obtained by shaking the brew in a stoppered graduate and timing the rate of foam subsidence. To make this test the brew prepared as described above was allowed to stand until it cooled to 25° C. whereupon 50 cc. were shaken 50 times by hand in a (100 cc.) stoppered graduate. The graduate was allowed to stand and the foam height was observed after 10, 20 and 30 minutes. The readings are given in the following table. The graduate test has been found to correlate empirically with the cup test and has the advantage of giving more easily reproducible results. Results are considered satisfactory if foam height in centimeters is less than 20 at 10 minutes, 15 at 20 minutes and 10 at 30 minutes.

*Rate of foam subsidence*

| Substance Added | Concentration [1] | Foam Height, cm., after—minutes | | |
|---|---|---|---|---|
| | | 10 | 20 | 30 |
| Untreated instant coffee | | 28 | 24 | 22 |
| Coffee fatty acids—unrefined | 1– 5,000 | 2 | 1 | 1 |
| Do | 1–10,000 | 3 | 2 | 1 |
| Do | 1–15,000 | 3 | 2 | 2 |
| Do | 1–20,000 | 3 | 2 | 2 |
| Do | 1–40,000 | 30 | 18 | 12 |
| Coffee fatty Acids—refined | 1–10,000 | 12 | 7 | 5 |
| Sodium salt of Coffee fatty Acids—crude | 1– 5,000 | 1 | 1 | 0 |
| Sodium salt of Coffee fatty Acids—refined | 1– 5,000 | 4 | 3 | 2 |
| Coffee oil—unsaponified | 1– 5,000 | 30 | 26 | 22 |
| Coffee oil—unsaponifiable matter | 1– 5,000 | 30 | 22 | 20 |
| Lauric Acid, U.S.P | 1– 5,000 | 4 | 3 | 3 |
| Stearic Acid, U.S.P | 1– 5,000 | 5 | 3 | 2 |
| Oleic Acid, U.S.P | 1– 5,000 | 6 | 5 | 3 |
| Ammonium Stearate, U.S.P | 1– 5,000 | 5 | 5 | 3 |
| Calcium Stearate, U.S.P | 1– 5,000 | 3 | 2 | 2 |
| Pure Castille soap | 1– 5,000 | 10 | 8 | 7 |

[1] Parts instant coffee per part of added substance.

In the foregoing table the coffee oil was obtained in accordance with Example 1 and the coffee fatty acids and salts were obtained from this coffee oil in accordance with Example 3.

Since certain changes may be made in the above process and product which embody the invention without departing from its spirit or scope, it is intended that all matter contained in the above description shall be interpreted as illustrative and not in a limiting sense. It is also to be understood that the following claims are intended to cover all of the generic and specific features of the invention herein described.

We claim:

1. An instant coffee containing a small but effective amount of an edible compound of the group consisting of fatty acids having at least twelve carbon atoms and their salts to substantially reduce foaming when the instant coffee is dissolved in water.

2. An instant coffee as claimed in claim 1, wherein the fatty acids and their salts have from 12 to 20 carbon atoms.

3. An instant coffee as claimed in claim 1, wherein the edible compound is the crude preparation obtained by saponification of coffee oil.

4. An instant coffee as claimed in claim 1, wherein the edible compound is the crude fatty acid preparation obtained by saponification of coffee oil and hydrolysis of the resulting soaps.

5. An instant coffee as claimed in claim 4, wherein the coffee oil is from roasted coffee.

6. An instant coffee as claimed in claim 4, wherein the coffee oil is from green coffee.

7. An instant coffee as claimed in claim 4, wherein the coffee oil is from spent coffee grounds.

8. An instant coffee as claimed in claim 4, wherein the coffee oil is from coffee chaff.

9. The method of reducing the foaming tendency of instant coffee which comprises incorporating therein a small but effective amount of an edible compound of the group consisting of fatty acids having at least twelve carbon atoms and their salts to substantially reduce foaming when the instant coffee is dissolved in water.

10. The method as claimed in claim 9 wherein the fatty acids and their salts have from 12–20 carbon atoms.

11. The method as claimed in claim 9 wherein the edible compound is the crude preparation obtained by saponification of coffee oil.

12. The method as claimed in claim 9 wherein the edible compound is the crude fatty acid preparation obtained by saponification of coffee oil and hydrolysis of the resulting soaps.

13. The method of reducing the foaming tendency of instant coffee which comprises dispersing an edible compound of the group consisting of fatty acids having at least 12 carbon atoms and their salts in an aqueous extract of roasted coffee and then spray drying the extract, the amount of the edible compound being sufficient to substantially reduce the foaming of the instant coffee when it is dissolved in water.

14. The method according to claim 13 wherein the edible compound is the crude preparation obtained by saponification of coffee oil.

15. The method according to claim 13 wherein the edible compound is the crude preparation obtained by saponification of coffee oil and hydrolysis of the resulting soaps.

References Cited in the file of this patent

UNITED STATES PATENTS

| | | |
|---|---|---|
| 1,957,514 | Wolfson | May 8, 1934 |
| 2,052,164 | Buc | Aug. 25, 1936 |
| 2,350,903 | Kellogg | June 6, 1944 |

OTHER REFERENCES

Food Research, vol. 2, No. 1, 1937, pp. 1–20 (pp. 1–3 relied upon).

Chemical Industries, May 1949, pp. 757–759.

Structure and Composition of Foods, Winton, vol. IV, pp. 156–157.